G. R. MOORE.
Culinary Vessels.
No. 148,130. Patented March 3, 1874.
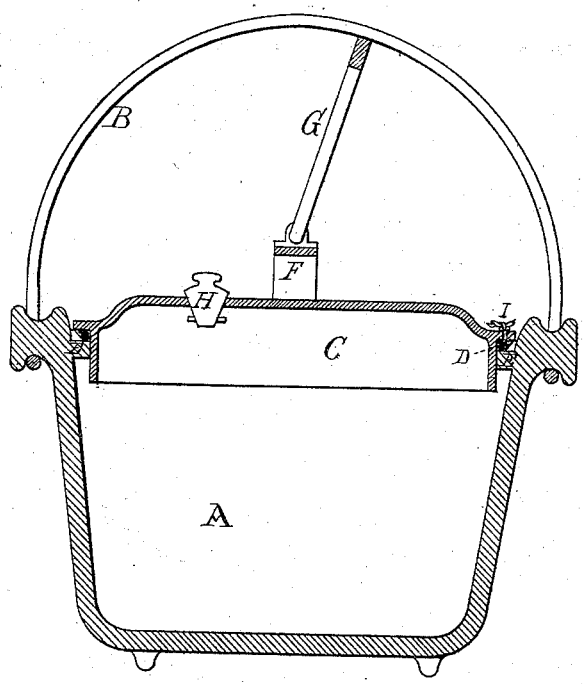
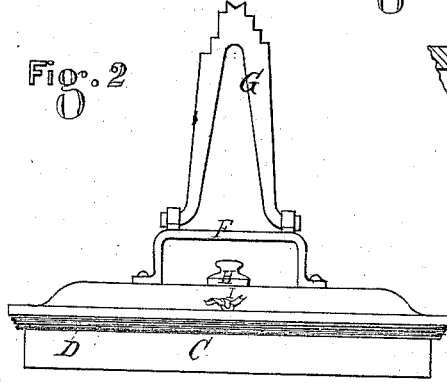
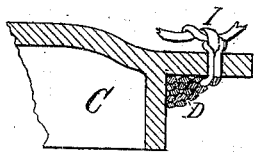

UNITED STATES PATENT OFFICE.

GEORGE R. MOORE, OF PHILADELPHIA, PENNSYLVANIA.

IMPROVEMENT IN CULINARY VESSELS.

Specification forming part of Letters Patent No. 148,130, dated March 3, 1874; application filed October 14, 1873.

*To all whom it may concern:*

Be it known that I, GEO. R. MOORE, of the city of Philadelphia, in the county of Philadelphia and State of Pennsylvania, have invented Improvements in Close-Fitting Lids for Cooking-Utensils, of which the following is a specification:

The object of my invention is to provide facilities for conveniently making the removable lids of vessels used for cooking and other purposes nearly steam-tight at will, so as to conserve the steam heat, after its production, to any extent desired in cooking, and yet without danger of explosions. I furnish the lids with a permanently-attached jointed brace, having bearings of unequal distance from the place of jointing, which is near the surface of the lid, which brace, with the bail of the vessel, in the usual form, clamps the lid upon its seat. I also provide suitable apertures in the rim of the lid for passing the ends of fibrous-thread or small-cord packing up through the edge, so that the fastening-knot will be above, and not interfere with, the joint, but will leave it smooth and even, thus removing all difficulty in using small-cord packing.

Figure 1 is a vertical transverse section of an ordinary vessel of iron-ware with my improvements applied. Fig. 2 is a front view of the lid. Fig. 3 shows a portion of the lid on a larger scale.

A is the vessel; B, the bail; C, the lid; D, the fibrous or elastic packing, filling the joint between the rim of the lid and the rim of the vessel E. E is a turned and true rim at the top of the vessel to constitute a suitable seat for the lid and the packing D. F is the ordinary handle to the lid. G is a brace jointed to the lid, (in this case, upon the handle,) so that, when the bail of the vessel rests upon it and it is turned toward a vertical line, it will increasingly wedge the lid upon the rim of the vessel. The bail B being elastic, it will yield to a reasonable pressure of steam, and allow it to escape; also, steam under much pressure will escape through the fibrous packing. H is a safety-valve. I shows how the packing is fastened to the lid, by passing through apertures for it in the rim and tying it at I.

The lid can be used as an ordinary lid; but if it is desired to have it tight enough to conserve steam, turn up the bail B and bring the brace G to a vertical line. Then in the use of the vessel it will be found that much of the steam heat may be conserved.

I claim—

1. The close-fitting lid C, in combination with the jointed brace G, having bearings of unequal length from the point where it is jointed, to receive the bail of the kettle, substantially as and for the purpose herein set forth.

2. The mode of fastening the fibrous packing D to the rim of the cover by passing it through the aperture I and fastening the ends above the flange, substantially as and for the purpose herein set forth.

GEO. R. MOORE.

Witnesses:
J. PLANKINTON,
JOS. MANUEL.